Feb. 25, 1969   J. E. TURNER   3,429,712
METHOD FOR PRODUCING YEAST-LEAVENED BAKED GOODS
Filed April 29, 1965
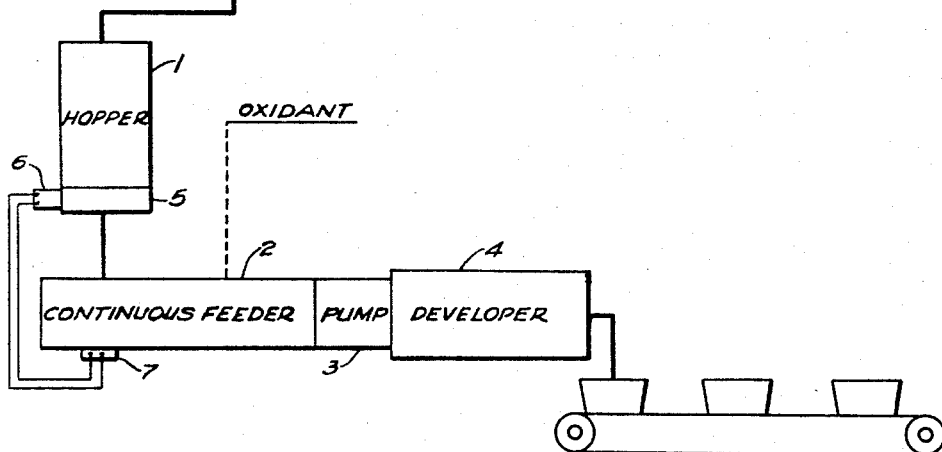
INVENTOR
JOE E. TURNER
BY Arnold & Roylance
ATTORNEYS

United States Patent Office 3,429,712
Patented Feb. 25, 1969

3,429,712
METHOD FOR PRODUCING YEAST-LEAVENED BAKED GOODS
Joe E. Turner, San Antonio, Tex., assignor to Mrs. Bohnet's Bakery, Inc., San Antonio, Tex., a corporation of Texas
Filed Apr. 29, 1965, Ser. No. 451,776
U.S. Cl. 99—90   3 Claims
Int. Cl. A21d 13/02, 8/00

ABSTRACT OF THE DISCLOSURE

Bread of improved body, aroma, texture and appearance is obtained by preparing a fermented sponge, combining the sponge with additional dough-forming ingredients to form a preliminary dough which contains 63–75% water, based on total flour, and is in such substantially undeveloped state as to exhibit no significant elasticity, and subjecting the preliminary dough to a short time high speed developing step, as by the usual continuous-mix developer. Particularly advantageous embodiments use no oxidant.

---

This invention relates to the production of baked goods and, more particularly, to an improved method for producing bread and other yeast-leavened baked products.

In modern commercial bakery practice, most bread is produced by either the conventional batch method or the high speed continuous-mix method. Considering economics of production and quality of product, each of these methods has both distinct advantages and significant drawbacks. In the conventional batch methods, whether employing the straight-dough procedure or the sponge-dough procedure, baked goods of excellent overall quality can be produced but the methods are relatively complicated as to manipulative steps, are costly in labor, and require amounts of time which are excessive by modern standards. The newer continuous-mix method has the advantage of reducing the time and labor required, but the finished baked goods are thought by many to be of poorer flavor and aroma than more conventionally produced products, and to have a weak internal structure, lacking tenacity and elasticity. In general, though both the batch method and the continuous-mix method are widely and successfully employed, there has been a continuing demand in the baking industry for further improvement.

In general terms, the advantages and disadvantages of the two methods result from the manner in which fermentation and dough development are accomplished. In the batch methods, either a sponge or a dough is prepared according to a formulation desired to give good fermentation for yeast propagation with attendant production of flavor and aroma factors, and fermentation and dough development are accomplished under optimum conditions. Though this procedure can assure an excellent finished product, it unfortunately requires a rather complicated overall handling schedule. The continuous-mix method, on the other hand, employs a liquid brew or broth, with fermentation being accomplished in the brew or broth for flavor production, the brew or broth then being continuously combined with flour and other ingredients to form a pre-mix which is passed through a continuous, very high speed dough developer. It appears that the relatively poor flavor and aroma of the continuous-mix product results from the fact that fermentation is accomplished in the brew or broth, the fact that a relatively large amount of chemical oxidant must be added to the pre-mix, and from other factors inherent in the process, such as the relatively high temperature of the pre-mix as it is delivered to the developer, and the high operating speed of the developer. Those skilled in the art of baking have accordingly sought to devise a new process which would combine the best features of the batch method and the continuous-mix method, using the fermented sponge or dough of the former and the high speed continuous dough developing step of the latter. Such efforts have, however, been virtually without success, at least insofar as creation of a commercially practical method is concerned. Lack of success has resulted primarily because the sponges and doughs which are produced in accordance with the batch methods, or variations thereof, are not capable of being fed continuously, and are not of such nature as to produce a proper dough as a result of the high speed dough developing step.

It is accordingly a general object of this invention to provide a method whereby the favorable fermentation of the conventional batch procedures is retained, with development of the dough being accomplished in the same manner as has been followed in the continuous-mix method.

Another object is to devise such a method which is economical insofar as time and labor are concerned, yet produces a baked product which is markedly better in body, flavor, aroma, texture and appearance, and slices, handles and keeps better than comparable products made by the continuous-mix method.

A further object is to provide a method for producing bread and the like which employs high-speed continuous dough development but avoids the use of a liquid brew or broth in preparing the dough.

Yet another object is to provide such a method, employing high speed dough development, which is better adapted to the production not only of white bread but also of variety breads than is the continuous-mix method presently in use in the industry.

A still further object is to devise a method for producing baked goods which employs high speed continuous dough development but is operative without the addition of any chemical oxidizing agent, such as bromate or iodate, as an additive preparatory to dough development.

Another object is to provide a method for producing baked goods which employs high speed continuous dough development and allows at least minimizing of chemical oxidants, with attendant avoidance of chemical odor and flavor in the finished product.

For purposes of definition, the continuous- mix process as referred to herein is that process practiced in the baking industry by use of the high speed equipment manufactured (1) by Bakery Machinery Division, American Machine & Foundry Co., 261 Madison Avenue, New York, N.Y., and referred to as the Amflow equipment, and (2) by Baker Process Co., Belleville, N.J., and referred to as the Do-Maker equipment, such equipment, and the manner of its use, being described in U.S. Patents 2,931,320, issued Apr. 5, 1960, to David Bandel; 2,953,460, issued Sept. 20, 1960, to John C. Baker; 2,971,845 and 3,006,765, issued Feb. 14, 1961, and Oct. 31, 1961, respectively, to Charles G. Ferrari; and 3,108,878, issued Oct. 29, 1963, to Kazuo Higashiuchi et al.; and "Bakers Weekly," vol. 191, No. 7 (Aug. 14, 1961).

Stated broadly, the invention is based on the discovery that, commencing with a fermented sponge, it is possible to prepare a preliminary dough which is, for practical purposes, undeveloped and capable of being fed continuously to a high-speed continuous dough developer under circumstances such that no significant dough development occurs during feeding and proper dough development is achieved dependably in the dough developer.

As illustrated by the single figure of the accompanying drawing, which forms a part of this specification, the present method can be practiced by delivering the ingredients for the sponge to a conventional batch mixer, the sponge being mixed and then delivered to the usual trough for fermentation. At the end of the fermentation period, the sponge and the additional ingredients for the dough are delivered to the batch mixer and the mixer is operated to accomplish incorporation only, producing a flowable preliminary dough of slurry-like consistency without effecting significant dough development, that is, without the preliminary dough acquiring observable elasticity. The resulting preliminary dough batch is then delivered to a hopper 1 and fed by gravity continuously from the hopper into a feeding or conveying device 2. Device 2 acts to feed the preliminary dough positively and continuously, without effecting significant dough development, to the usual pump 3 which delivers the preliminary dough to the high speed continuous dough developer 4, which can be of the general type described in the aforementioned Patents 2,931,320 and 2,053,460, and which subjects the dough to a high energy mixing action capable of developing the dough in a time as short as less than one minute. The developed dough is discharged continuously from the dough developer into baking pans, and proofing and baking is accomplished in the usual manner.

As an alternative procedure, a powdered oxidant composition is supplied continuously to the feeder or conveyor 2 which then serves both to advance or feed the preliminary dough and to incorporate the oxidant composition therein.

Success of the method depends upon formation, from a fermented sponge, of a uniform, homogeneous preliminary dough which is so fluid that it can be fed or conveyed continuously and positively, while achieving at least substantially uniform incorporation of the oxidant when an oxidant is employed, the steps of mixing and feeding the preliminary dough being accomplished without material dought development occurring. In this regard, the proportion of water employed is particularly important, as is the time period of dough mixing.

The sponge necessarily comprises a major proportion of the total flour and water for the formula, as well as yeast, yeast food and shortening. The flour for the sponge amounts to 60–85% of the total flour weight. Based on total flour weight, the amount of water for the sponge is 35–46%, the amount of shortening is 1–5%, the amount of yeast is 1–6%, and other ingredients or additives can be employed in conventional proportions.

The sponge is mixed in conventional batch mixing equipment in such fashion that uniformity is achieved and the physical effect on the dough is equivalent to that resulting from 2.5–10 minutes of mixing with at least ⅕ of that period being at slow speed and at least ½ of that period at high speed. Operation of a conventional batch mixer at approximately 34 r.p.m. is typical of slow speed mixing, and operation at approximately 68 r.p.m. is typical for high speed mixing. The sponge is delivered out of the mixer at a temperature of 70–83° F. The fermentation period is 1–5 hours, with the sponge temperature at the end of the fermentation period being 74–96° F.

After fermentation, the sponge can be returned to the same batch mixer and the remaining constituents of the preliminary dough are incorporated. At this stage, the balance of the flour is introduced. Water in an amount to bring the total water up to 64–75% of the total flour weight is added. Sucrose equal to 5.0–11.5% of the total flour weight, or dextrose equal to 6.50–13.75% of the total flour weight, or a correspondingly proportioned combination of sucrose and dextrose, is employed. Salt is employed in an amount equal to 1.75–2.62% of the total flour weight. Milk powder, bread improvers, and/or dough conditioners can be employed in conventional proportions.

At the dough stage, mixing is carried out for the minimum time in which uniform incorporation can be achieved. Depending upon the particular formulation, the particular mixing equipment, and the speed or speeds of mixing, the mixing period can be as short as 3 minutes and as long as 10 minutes. Typically, initial and terminal periods of high speed mixing, with an intermediate period of low speed mixing, can be used with the total high speed and low speed times being equal. In all cases, the mixing factors, including the term of mixing within the 3–10 minutes range, are so selected that the resulting physical working of the sponge and the dough ingredients will achieve homogeneity but will develop no observable elasticity in the dough.

It will be understood that, in practicing the method on a commercial scale, each batch mixing operation produces a large quantity of the slurry-like preliminary dough and that such quantities can be moved from one location to another in a conventional dough trough, for example. Thus, in typical operation, the preliminary dough is discharged from the batch mixer into a dough trough and the trough is hoisted above the vertical hopper 1 and discharged into the hopper. Hopper 1 is provided with a circular discharge opening, defined by an adjustable gate or nozzle 5. Gate 5 is operated by a pneumatic or equivalent power device 6 controlled electrically, as by a control circuit responsive to a device 7 for sensing the amount of preliminary dough in feeder 2. With feeder 2 operating continuously, the preliminary dough is discharged by gravity into the input end of the feeder continuously at a rate determined by the size of the circular opening defined by gate 5. The gate is controlled to provide in the feeder 2 an amount of dough which does not exceed the capacity of the feeder. Build-up of excessive preliminary dough in the feeder is rigorously avoided for two reasons. First, any tendency for the preliminary dough to build-up excessively in feeder 2 will cause dough development to occur in the feeder, and successful uniform operation of the process depends on avoiding significant dough development at all stages between the end of the fermentation period for the sponge and entrance of the preliminary dough into the continuous developer 4. Second, if the amount of preliminary dough delivered to the feeder is more than the feeder can advance continuously, and an oxidant is employed, the proportion of oxidant in the dough will vary, since the oxidant composition is being supplied continuously at a rate predicated upon that quantity of dough which the feeder 2 can handle without build-up.

When an oxidant is used, it is particularly important to employ the oxidant in a form which allows adequately uniform incorporation of the oxidant during the feeding action of device 2. Accordingly, a special oxidant composition is employed in the form of a very fine, dry powder comprising a minor proportion of a least one oxidizing compound suitable for use in the high speed continuous dough developer, and a major proportion of at least one edible carbohydrate material as an extender. Fine particle size for all constituents of the oxidant composition is particularly important, and it is therefore advantageous to employ solid inorganic oxidizing compounds such as potassium bromate, potassium iodate and calcium iodate, in uniform admixture with such extenders as powdered dextrose and powdered starch. Advantageously, the carbohydrate extender or extenders constitute at least 90% of the oxidant composition, and at least one-third of the total extender material employed is a soluble carbohydrate such as dextrose. Best results are obtained when the oxidizing compounds include a bromate and an iodate in a weight ratio of about 3:1.

Superior results are attained when the oxidizing composition consists of particulate solid constituents of fine particle size. Thus, inorganic oxidizing compounds having an average particle size not exceeding 149 microns (100 mesh U.S. Standard Sieve Series) are particularly advantageous. Employed as an extender, starch having an average particle size not exceeding 62 microns (230 mesh) and as small as 44 microns (325 mesh) is particularly effective. Used in smaller proportion than the starch, dextrose can advantageously be employed with an average particle size up to 210 microns (70 mesh).

Employing the combination of a bromate and an iodate, the oxidizing composition is so formulated, and fed at such a rate, that the bromate is incorporated in the preliminary dough in an amount equal to 40–90 parts per million, based on the total flour weight, and the iodate at an amount equal to 10–30 parts per million, based on total flour. The dry oxidizing material can be supplied to the preliminary dough by a vibratory feeder or any other suitable conventional device.

Feeding of the preliminary dough can be accomplished with any feeding or conveying device capable of achieving a continuous and positive advance of the preliminary dough while applying only a minimum of physical working of the dough. Typically, the feeder 2 can be of the type employing a single axial shaft equipped with a minimum number of feeding blades or paddles 11 disposed at an angle for advancing, rather than agitating, the preliminary dough. The conventional pump of the continuous-mix equipment is retained for the purpose of supplying the preliminary dough from the feeder or conveyor 2 to the continuous dough developer 4, the pump being operated at as low a speed as is practical to minimize physical working of the preliminary dough.

A particular advantage of the method is that the operation of the dough developer need not be controlled as closely as is usually necessary in the continuous-mix methods employed heretofore. Thus, employing the conventional dough developer of the Baker Process Co. Do-Maker equipment, satisfactory dough development has been achieved, employing the present invention, with the dough developer operating as slowly as 90 r.p.m. and as rapidly as 2220 r.p.m., with the temperature of the emerging dough being 88–95° F. compared to the usual temperature of over 100° F.

Though the precise reasons are not understood in detail, the method of this invention eliminates or greatly minimizes the objectionable chemical flavor and aroma characteristic of breads made by the conventional continuous mix process.

In general, the improvements accomplished by the invention stem at least in part from the high water content of 63–75%, based on total flour weight, and advantageously 65–70%, of the preliminary dough and the fact that the preliminary dough is substantially undeveloped.

The following example illustrates the method as practiced without the addition of any oxidizing additive to promote dough development:

Example 1

Employing a conventional batch mixer, a sponge was prepared with the following formulation:

| | |
|---|---|
| Bleached wheat flour | 70 lbs. |
| Water | 40 lbs. |
| Yeast | 3 lbs. 8 oz. |
| Yeast food | 12 oz. |
| Emulsifier | 8 oz. |
| Lard | 3 lbs. 8 oz. |
| Stearin flakes | 1.5 lbs. |

Mixing was carried out for 1 minute at low speed (34 r.p.m.) and 4 minutes at high speed (68 r.p.m.) The temperature of the sponge on discharge from the mixer was 72° F.

The sponge was discharged into a conventional dough trough and held for fermentation for 2.5 hours, the temperature of the sponge on discharge from the mixer was The fermented sponge was then returned to the mixer and the additional materials for the dough added, as follows:

| | |
|---|---|
| Bleached wheat flour | 30 lbs. |
| Water | 27 lbs. |
| Salt | 2 lbs. 4 oz. |
| Sugar | 8 lbs. |
| Non-fat milk solids | 2 lbs. |
| Dough conditioner containing active lipoxidase and partially dextrinized corn flour | 1 lb. |
| Calcium peroxide dough conditioner | 2 oz. |

Mixing was carried out for 2 minutes at high speed, 3 minutes at low speed, and 1 minute at high speed. The preliminary dough so produced had high fluidity, being of a slurry-like consistency, exhibited no observable elasticity, and had a temperature of 81° F. Upon completion of the mixing step, the preliminary dough was discharged from the mixer directly into a dough trough, the trough rolled to and hoisted above a hopper of the type described hereinbefore, and the preliminary dough dumped into the hopper.

For the remainder of the process, the equipment employed included the pre-mixer, pump and dough developer of a Baker Process Co. Do-Maker continuous-mix plant, with the pre-mixer modified to accomplish continuous feeding, and incorporation of the oxidant composition, without such physical working of the dough as would cause significant dough development. Only the downstream one-half of the preliminary mixer was employed and this was modified by removing the first two blades completely, remounting the blades so that all acted to feed the preliminary dough forwardly (rather than having any blades disposed to oppose feeding and thereby cause mixing or working of the preliminary dough), and changing the speed to 75% of the speed at which the preliminary mixer is conventionally operated. Thus modified, the device operated to advance the preliminary dough continuously and positively to the pump but with such low "punishment" of the preliminary dough that no dough development, indicated by observable elasticity, could be detected at the output end of the feeder.

The high speed dough developer was operated continuously at 110 revolutions per minute, the finished dough being extruded from the dough developer in the usual fashion, but with a temperature of 91° F., cut to the proper quantities for 1-pound loaves, deposited in the pans, proofed and baked. The proof time was 55 minutes with the proof box temperature 103° F. (dry bulb), 97° (wet bulb). The finished bread was compared with bread produced in a Baker Process Co. Do-Maker baking plant operated conventionally and employing the usual brew and pre-mix steps.

The bread produced in accordance with this example, when compared with the conventional continuous-mix bread, was found to have a better flavor; improved aroma free from the chemical odor which usually characterizes continuous-mix bread; improved texture, with no gumminess, and better overall eating and toasting qualities; a more uniform crust color; stronger side walls and no tendency to shrink away from the pan during baking; better slicing characteristics because of the improved body and freedom from gumminess, the slices appearing cleaner and free from evidence of tearing; and excellent resiliency and "spring back," so that the loaves handle and stack better in the store. In addition, the bread made in accordance with this example was softer at the outset and retained its softness and other "freshness characteristics" longer than the conventionally produced continuous-mix bread. A typical comparative score is as follows:

|  | Bread of Example 1 | Conventionally Produced Continuous-Mix Bread |
|---|---|---|
| Loaf volume | 7.00 | 7.00 |
| General appearance | 6.70 | 6.60 |
| Bloom | 4.70 | 4.40 |
| Crust | 7.70 | 7.50 |
| Crumb color | 6.65 | 6.60 |
| Texture | 13.90 | 13.50 |
| Grain | 7.00 | 7.70 |
| Keeping quality | 8.00 | 7.90 |
| Flavor | 18.80 | 18.30 |
| Eating quality | 13.90 | 13.00 |
| Total | 94.35 | 92.50 |

As an additional improvement, the method exhibits a substantial saving in sugar, on the order of 2% based on total flour weight, without impairing the sweetness of the baked product.

For reasons not fully understood, the method of this invention makes it possible to employ conventional bread improvers and dough conditioners, added at the dough stage, even though dough development is effected in the high speed continuous dough developer. Thus, as in Example 1, active lipoxidase and calcium peroxide, when added during mixing of the preliminary dough, exhibit their normal improving effects, though they have no effect when added in the brew or the pre-mix of the conventionally operated continuous-mix process.

Example 2

To demonstrate operability of the method when an oxidant is incorporated in the preliminary dough, the procedure of Example 1 is repeated but with a pulverulent solid oxidizing composition supplied continuously to the feeder 2 for incorporation in the preliminary dough.

The oxidizing composition consisted of a uniform admixture of 3.84% by weight potassium bromate, 1.28% calcium iodate, 44.88% powdered dextrose, and 50.00% powdered starch was employed. This composition was fed continuously into the preliminary dough feeder at a rate providing 1 oz. of the oxidizing composition for each 100 lbs. of flour, thus providing 24 parts per million of potassium bromate and 8 parts per million of calcium iodate, based on flour weight.

Aside from addition of the oxidant, the only change in formulation was an increase in water, at the preliminary dough stage, to 68 lbs. The high speed continuous dough developer was operated at 155 r.p.m., the temperature of the emerging developed dough being 93° F. The proofing time was reduced to 49 minutes.

The finished bread had all of the desirable characteristics of the bread of Example 1 and, in addition, the grain was superior not only to the bread of Example 1 but also to conventionally produced continuous-mix bread. Thus, the bread of this example scored 7.80 for grain, increasing the total score to 95.15.

Example 3

To demonstrate the significance of the substantially undeveloped, slurry-like preliminary dough in the process, the procedure of Example 1 is repeated except that, at the dough mixing stage, the mixing time is increased to provide 4 minutes at high speed, 6 minutes at low speed, and 2 minutes at high speed. The resulting dough shows substantial elasticity and, therefore, substantial dough development. This dough does not feed by gravity through hopper 1 and, if discharged directly into the preliminary dough feeder 2, is physically worked, as it is advanced through the feeder, so that further dough development occurs before entry into the dough developer. The high speed continuous dough developer fails to produce a useful dough, and the entire procedure fails.

Example 4

To demonstrate the importance of the high water content of the preliminary dough, the procedure of Example 1 is repeated, except that 38 lbs. of water is employed in the sponge, and an additional 22 lbs. of water at the dough mixing stage. Even at the relatively short dough mixing time of 6 minutes, the preliminary dough exhibits such extensive dough development that it cannot be successfully fed and developed in accordance with Example 1.

Example 5

To demonstrate successful operation of the method with higher proportions of water, the procedure of Example 2 is repeated, replacing the normal wheat flour of that example with a bleached bread wheat flour having a native protein content of 12.8% by weight. The amount of water in the sponge is increased to 43 lbs., and the water added at the dough stage is increased to 31 lbs., so that the total water content amounts to 74% of the flour weight. With the method carried out otherwise in accordance with Example 2, white bread comparable to that obtained in Example 2 is produced.

Example 6

To demonstrate the increased mixing tolerance afforded by the invention, the procedure of Example 2 is repeated with the dough developer operated at 190 r.p.m. The bread obtained is in all respects comparable to that from Example 2.

What is claimed is:
1. The method for producing bread comprising
    batch mixing at least flour, water, shortening and yeast to form a sponge containing 60–85% by weight of the total flour to be employed,
    fermenting the sponge;
    mixing the sponge and at least additional flour and water for a period not exceeding 10 minutes and under conditions to form a preliminary dough containing an amount of water equal to 65–75% of the total flour weight;
    providing in the preliminary dough a finely particulate oxidizer composition comprising at least one inorganic oxidizing compound in an amount in the range of 0–120 parts per million, based on the total flour;
    continuously supplying the preliminary dough, while the same is in such a substantially undeveloped state as to exhibit no significant elasticity, to a dough developer and operating the developer to subject the dough to a high energy, short time mixing action to provide a completed dough at 88–95° F.; and
    proofing and baking the dough to provide bread of improved body, aroma, texture and appearance.
2. A method according to claim 1 wherein
    the total amount of water in said preliminary dough amounts to 65–70% of the total flour weight.
3. A method according to claim 1 wherein
    said oxidizing compound consists of a uniform mixture of a solid inorganic bromate, a solid inorganic iodate, and at least one edible powdered carbohydrate material, selected from the group consisting of starch having an average particle size not exceeding 62 microns and dextrose having an average particle size not exceeding 210 microns.

(References on following page)

References Cited

UNITED STATES PATENTS

| | | | |
|---|---|---|---|
| 2,869,484 | 1/1959 | Patterson | 99—90 X |
| 2,953,460 | 9/1960 | Baker. | |
| 2,971,845 | 2/1961 | Ferrari | 99—91 X |
| 3,108,878 | 10/1963 | Higashiuchi et al. | 99—90 |
| 3,125,968 | 3/1964 | Baker. | |

FOREIGN PATENTS 594,287  3/1960  Canada.

LIONEL M. SHAPIRO, *Primary Examiner.*

U.S. Cl. X.R.

297—434

UNITED STATES PATENT OFFICE
CERTIFICATE OF CORRECTION

Patent No. 3,429,712                                              February 25, 1969

Joe E. Turner

It is certified that error appears in the above identified patent and that said Letters Patent are hereby corrected as shown below:

Column 6, line 6, "of discharge from the mixer was" should read -- at the end of that time being 76° F. --.

Signed and sealed this 24th day of March 1970.

(SEAL)
Attest:

Edward M. Fletcher, Jr.                               WILLIAM E. SCHUYLER, JR.

Attesting Officer                                                    Commissioner of Patents